(12) United States Patent
Shim et al.

(10) Patent No.: US 10,270,096 B2
(45) Date of Patent: Apr. 23, 2019

(54) POSITIVE ACTIVE MATERIAL FOR RECHARGEABLE LITHIUM BATTERY, METHOD OF PREPARING SAME AND RECHARGEABLE LITHIUM BATTERY INCLUDING SAME

(71) Applicant: SAMSUNG SDI CO., LTD., Yongin-si, Gyeonggi-do (KR)

(72) Inventors: Jae-Hyun Shim, Yongin-si (KR); Ki-Soo Lee, Yongin-si (KR); Jae-Han Lee, Yongin-si (KR); Se-Hee Lee, Yongin-si (KR); Hyeon-Ah Ju, Yongin-si (KR); Eun-Cheol Lee, Yongin-si (KR); Joo-Han Song, Yongin-si (KR); Yun-Hee Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 568 days.

(21) Appl. No.: 14/971,375

(22) Filed: Dec. 16, 2015

(65) Prior Publication Data

US 2016/0181610 A1    Jun. 23, 2016

(30) Foreign Application Priority Data

Dec. 17, 2014 (KR) ........................ 10-2014-0182530

(51) Int. Cl.
*H01M 4/525* (2010.01)
*H01M 4/36* (2006.01)
(Continued)

(52) U.S. Cl.
CPC ............ *H01M 4/525* (2013.01); *C01G 51/42* (2013.01); *H01M 4/366* (2013.01);
(Continued)

(58) Field of Classification Search
CPC ................. H01M 4/525; H01M 4/366; H01M 2004/021; H01M 10/052; C01P 2006/10;
(Continued)

(56) References Cited

U.S. PATENT DOCUMENTS

2012/0282522 A1* 11/2012 Axelbaum ............. B82Y 30/00
429/219
2014/0045067 A1    2/2014 Cho et al.

FOREIGN PATENT DOCUMENTS

JP          2007-128714 A    5/2007
KR   10-2007-0095200 A    9/2007
(Continued)

OTHER PUBLICATIONS

Pu, et al., "Controlled Crystallization of Spherical Active Cathode Materials for NiMH and Li-ion Rechargeable Batteries," Journal of New Materials for Electrochemical Systems 8 (2005) pp. 235-241.
(Continued)

*Primary Examiner* — Gary D Harris
(74) *Attorney, Agent, or Firm* — Lee & Morse, P.C.

(57) ABSTRACT

A positive active material for a rechargeable lithium battery includes a $LiCoO_2$ particle. An interior of the particle has a layered structure and a surface of the particle has a spinel structure.

13 Claims, 21 Drawing Sheets

(51) Int. Cl.
*C01G 51/00* (2006.01)
*H01M 10/052* (2010.01)
*H01M 4/02* (2006.01)

(52) U.S. Cl.
CPC ...... *C01P 2002/20* (2013.01); *C01P 2002/34* (2013.01); *C01P 2002/72* (2013.01); *C01P 2004/02* (2013.01); *C01P 2004/03* (2013.01); *C01P 2004/04* (2013.01); *C01P 2004/32* (2013.01); *C01P 2004/61* (2013.01); *C01P 2004/84* (2013.01); *C01P 2006/10* (2013.01); *C01P 2006/40* (2013.01); *H01M 10/052* (2013.01); *H01M 2004/021* (2013.01)

(58) Field of Classification Search
CPC .............. C01P 2004/84; C01P 2004/61; C01P 2002/34; C01P 2002/20; C01P 2004/32; C01P 2004/04; C01P 2004/03; C01P 2002/72; C01P 2006/40; C01P 2004/02; C01G 51/42

USPC ...................................................... 429/231.3
See application file for complete search history.

(56) References Cited

FOREIGN PATENT DOCUMENTS

KR  10-2012-0052100 A   5/2012
KR    10-1316053 B1   10/2013

OTHER PUBLICATIONS

Pereira, et al., "Thermodynamically Induced Surface Modification for the Stabilization of High-Capacity $LiCoO_2$," Journal of the Electrochemical Society, 155(11) (2008) pp. A831-A838.

Shim, et al., "Characterization of Spinel $Li_xCo_2O_4$-Coated $LiCoO_2$ Prepared with Post-Thermal Treatment as a Cathode Material for Lithium Ion Batteries", Chemistry of Materials, Apr. 10, 2015.

* cited by examiner

US 10,270,096 B2

POSITIVE ACTIVE MATERIAL FOR RECHARGEABLE LITHIUM BATTERY, METHOD OF PREPARING SAME AND RECHARGEABLE LITHIUM BATTERY INCLUDING SAME

CROSS-REFERENCE TO RELATED APPLICATION

Korean Patent Application No. 10-2014-0182530, filed on Dec. 17, 2014, in the Korean Intellectual Property Office, and entitled: "Positive Active Material for Rechargeable Lithium Battery, Method of Preparing Same and Rechargeable Lithium Battery Including Same," is incorporated by reference herein in its entirety.

BACKGROUND

1. Field

Embodiments relate to positive active material for a rechargeable lithium battery, a method of preparing the same, and a rechargeable lithium battery including the same.

2. Description of the Related Art

Recent developments in high-tech electronics have allowed electronic devices to become smaller and lighter in weight, which leads to an increase in portable electronic devices. As a power source for such portable electronic devices, the demands for batteries with high energy density are increasing and research on lithium rechargeable battery is briskly progressing.

A rechargeable lithium battery may be manufactured by an injecting electrolyte into an electrode assembly, which includes a positive electrode including a positive active material capable of intercalating/deintercalating lithium and a negative electrode including a negative active material capable of intercalating/deintercalating lithium.

SUMMARY

Embodiments are directed to a positive active material for a rechargeable lithium battery including a $LiCoO_2$ particle. An interior of the particle has a layered structure and a surface of the particle has a spinel structure.

The layered structure may be a $LiCoO_2$ phase. The spinel structure may be a $LiCo_2O_4$ phase.

The $LiCoO_2$ particle may have a true density of about 5.054 $g/cm^3$ to about 5.070 $g/cm^3$.

The $LiCoO_2$ particle may have a particle diameter (D50) of about 15 µm to about 25 µm.

The $LiCoO_2$ particle may have a spherical shape.

Embodiments are also directed to a method of preparing a positive active material for a rechargeable lithium battery including mixing a cobalt (Co) raw material having a particle diameter (D50) of about 10 µm to about 20 µm and a lithium (Li) raw material to obtain a mixture, and heat-treating the mixture. The heat-treating may include firing the mixture at a first temperature, and, after the firing, maintaining a resultant for a predetermined time at a second temperature lower than the first temperature.

The first temperature may be about 950° C. to about 1050° C. The second temperature may be about 650° C. to about 850° C.

The predetermined time that the resultant is maintained at the second temperature may be about 3 hours to about 6 hours.

The heat-treating may further include maintaining the mixture for a predetermined time at a third temperature before firing the mixture at the first temperature, the third temperature being lower than the first temperature.

The first temperature may be about 950° C. to about 1050° C. The third temperature is about 600° C. to about 700° C.

The predetermined time at which the mixture is maintained at the third temperature may be about 3 hours to about 6 hours.

The Co raw material and the Li raw material may be mixed such that a mole ratio of Co to Li is about 1:0.98 to about 1:1.02.

Embodiments are also directed to a rechargeable lithium battery including a positive electrode including the positive active material.

BRIEF DESCRIPTION OF THE DRAWINGS

Features will become apparent to those of skill in the art by describing in detail exemplary embodiments with reference to the attached drawings in which.

Figure 11A:
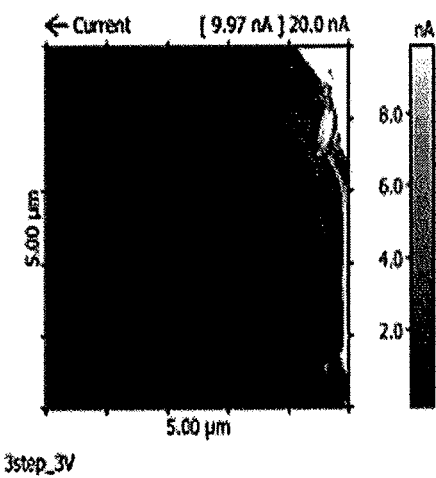
FIGS. 11(a) and (b) respectively show the current-AFM result on the surface of a particle and morphology in a measuring region.
Figure 11B:
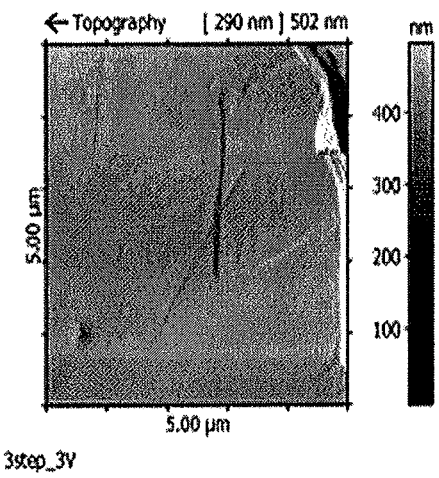
FIG. 11 illustrates a current-AFM (atomic force microscope) measurement results of the surface of the positive active material according to Example 1.
FIG. 11(d)
Figure 11C:
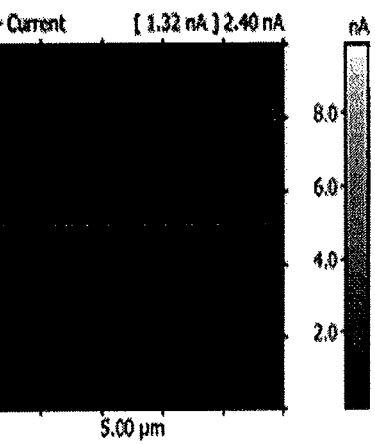
Figure 11D:
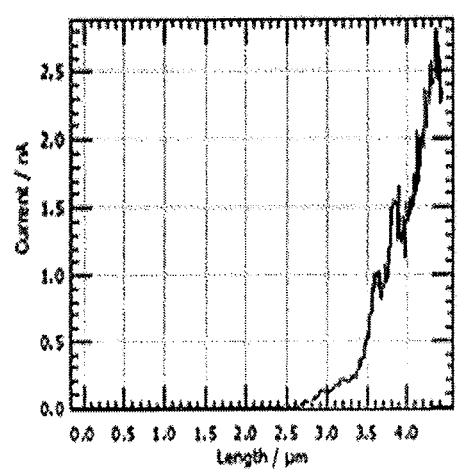

shows current line profiles with respect to a distance from the inside of a particle to the surface. The distance was measured from the line marked in FIG. 11(c).

Figure 12:
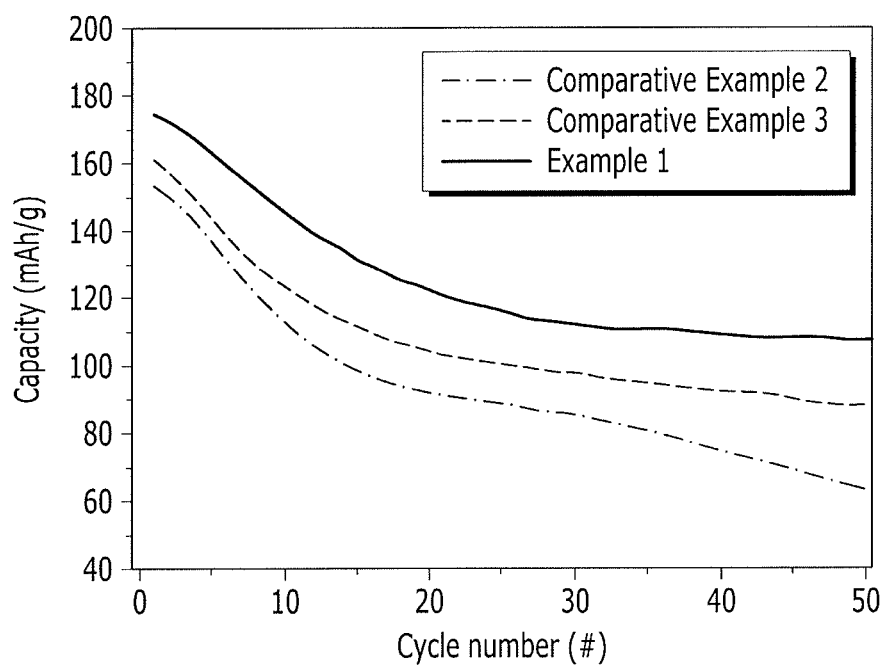

FIG. 12 illustrates a graph showing cycle-life characteristics of the rechargeable lithium battery cells according to Example 1 and Comparative Examples 2 and 3.

Figure 13:
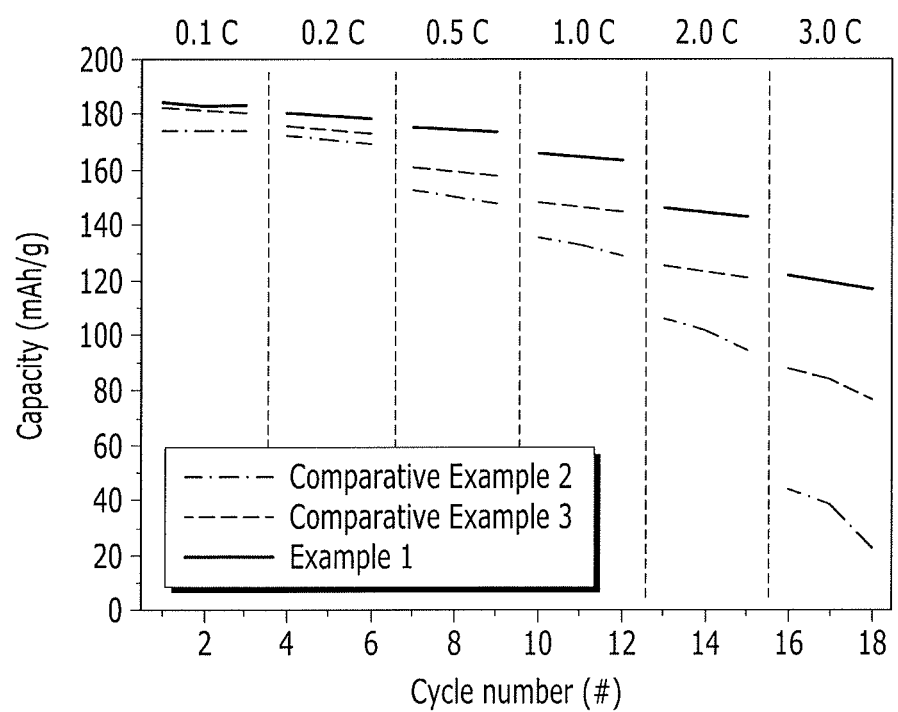

FIG. 13 illustrates a graph showing a rate capability of the rechargeable lithium battery cells according to Example 1 and Comparative Examples 2 and 3.

Figure 14:
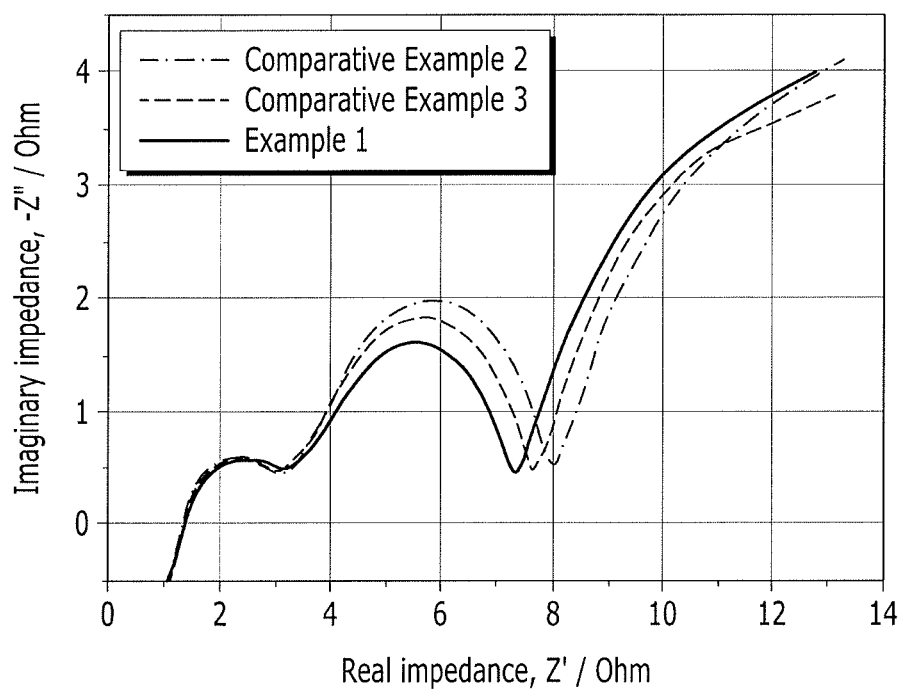

FIG. 14 illustrates a graph showing impedance of the rechargeable lithium battery cells according to Example 1 and Comparative Examples 2 and 3.

Figure 15:
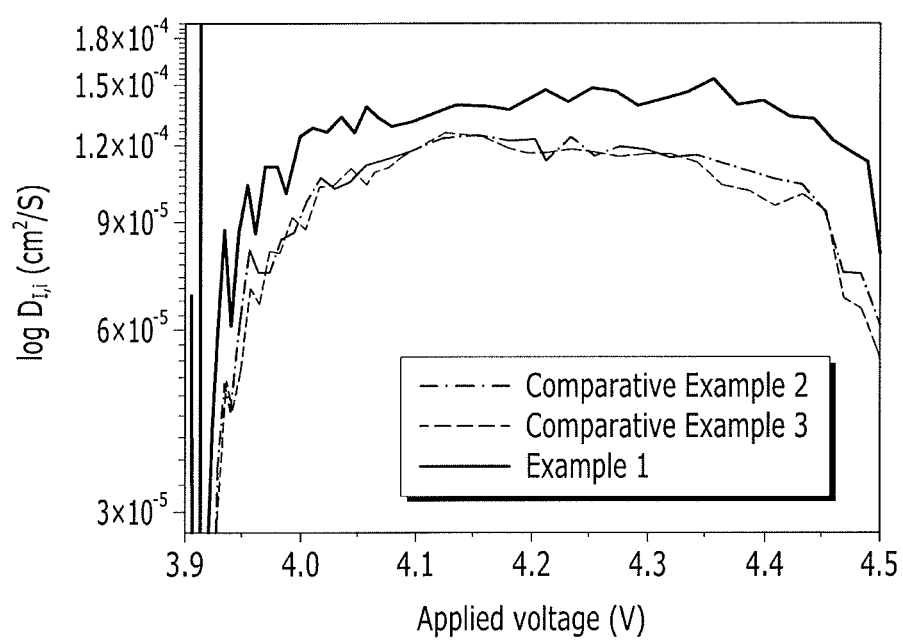

FIG. 15 illustrates a graph showing galvanostatic intermittent titration technique (GITT) results of the rechargeable lithium battery cells according to Example 1 and Comparative Examples 2 and 3.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

Hereinafter, a positive active material for a rechargeable lithium battery according to one embodiment is described.

A positive active material for a rechargeable lithium battery according to an embodiment may include a $LiCoO_2$ particle, wherein the interior or inner portion of the $LiCoO_2$ particle has a layered structure and the surface of the particle has a spinel structure. When the $LiCoO_2$ particle corresponding to a single material having different structures on the surface and the inside, for example, the $LiCoO_2$ particle having a spinel structure on the surface, is used as a positive active material for a rechargeable lithium battery, a rechargeable lithium battery having excellent cycle-life characteristics and rate capability may be realized by improving electrical conductivity. The surface of the particle may be its outmost surface. Herein, for ease of description, the positive active material is described by describing a $LiCoO_2$ particle. It is to be understood that the positive active material may include a plurality of the $LiCoO_2$ particle.

The layered structure of the inside of the particle may include a $LiCoO_2$ phase, and the spinel structure of the surface of the particle may include a $LiCo_2O_4$ phase.

The $LiCoO_2$ particle may have a spherical shape, as an example. When the $LiCoO_2$ particle is spherical, a rechargeable lithium battery having a high capacity may be realized by securing a positive electrode having high active mass density.

The $LiCoO_2$ particle may have a particle diameter (D50) of about 15 μm to about 25 μm, for example, about 15 μm to about 20 μm. When the $LiCoO_2$ particle has a size within the range, cycle-life characteristics of a rechargeable lithium battery may be improved by minimizing a side reaction of a positive active material with an electrolyte solution.

The $LiCoO_2$ particle may have decreased pores inside a positive active material due to active diffusion of lithium ions into the positive active material. The pores inside the positive active material may be identified by measuring the true density of the $LiCoO_2$ particle. For example, the $LiCoO_2$ particle may have a true density of about 5.054 g/cm$^3$ to about 5.070 g/cm$^3$, or, for example, about 5.057 g/cm$^3$ to about 5.065 g/cm$^3$. When the $LiCoO_2$ particle has true density within the range, the lithium ions may be actively diffused into the positive active material and thus, an amount of the $Li_2CO_3$ remaining on the surface of the $LiCoO_2$ particle may be decreased. As a result battery performance such as cycle-life characteristics and rate capability may be improved.

The true density may be measured by adsorbing a gas such as helium or the like in a sample and measuring a pressure change due to a volume decrease of the adsorbed gas with a true density measuring equipment (Gas Pycnometer, G PYC-100, PMI, USA).

Specifically, the volume (Vc) of a sample chamber into which the sample is injected and the volume (Vr) of a reference chamber, i.e. the volume of an expansion valve, may be measured. When helium gas is injected into the sample chamber by opening a gas inlet valve, an equilibrium pressure in the sample chamber is P1, and the volume of the sample chamber is Vc−Vs. Herein, the Vs indicates the volume of a sample. Subsequently, when the expansion valve is open, a new equilibrium pressure in the sample chamber is P2, the volume of the sample chamber is Vc−Vs+Vr. This may be expressed in a simple equation as follows: P1(Vc−Vs)=P2(Vc−Vs+Vr). The equilibrium pressures P1 and P2 are respectively measured by using a pressure transducer. The Vs may be easily measured, since the volumes Vc and Vr in two chambers are already known. The density of the sample may be calculated by measuring the weight of the sample as a balance. This measured volume of the sample is the volume of only the sample except for all the open pores in the sample. Accordingly, the true density of the sample may be obtained based on this volume.

Hereinafter, a method of preparing a positive active material for a rechargeable lithium battery according to an embodiment, for example, a method of preparing the $LiCoO_2$ particle is described.

The $LiCoO_2$ particle may be prepared by mixing a cobalt (Co) raw material and a lithium (Li) raw material to obtain a mixture and heat-treating the mixture.

In general, a $LiCoO_2$ particle having a diameter of about 15 μm or more could be prepared by using a small precursor having a size of about 3 μm to 4 μm, for example, $Co_3O_4$ to grow a crystal. A large amount of $Li_2CO_3$ would need to be used due to a high firing temperature and due to evaporation of lithium because of such a firing. When the $Li_2CO_3$ is used in a large amount, only a layered structure is formed and not a spinel structure.

According to an embodiment, use of an excessive amount of $Li_2CO_3$ may be avoided by using a precursor having a larger size than the above-mentioned range. Accordingly, a $LiCoO_2$ particle having a layered structure internally but a spinel structure on the surface may be obtained. The $LiCoO_2$ particle having this structure may have improved electrical conductivity and may contribute to improving cycle-life characteristics and rate capability of a rechargeable lithium battery. For example, the Co raw material may have a particle diameter (D50) ranging from about 10 μm to about 20 μm, or, for example, about 12 μm to about 20 μm, or, for example, about 12 μm to about 16 μm.

The Co raw material may include $Co_3O_4$, or the like, and the Li raw material may include $Li_2CO_3$, or the like.

The Co raw material and the Li raw material may be mixed such that a mole ratio of Co to Li is about 1:0.98 to about 1:1.02, or, for example, 1:0.98 to 1:1.01. When the raw materials are mixed within the range, an excessive amount of the $Li_2CO_3$ is not used, and the $LiCoO_2$ particle may have a layered structure internally but a spinel structure on the surface.

The heat-treatment may include firing at a first temperature and then maintaining a second temperature for a predetermined time during a period when the first temperature is being decreased. When the heat-treatment is performed by decreasing a temperature after firing the mixture at the first temperature and then, maintaining the second temperature, an internal defect or potential (dislocation) may move toward the surface of the $LiCoO_2$ particle during formation of the $LiCoO_2$ particle and may form a spinel structure on the surface. The heat-treatment may control the surface structure of the $LiCoO_2$ particle and thus, may increase the electrical conductivity of the surface. Accordingly, cycle-life characteristics and rate capability of a battery may be improved.

For example, the first temperature, which is a temperature at which the firing is performed, may be in a range of about 950° C. to about 1,050° C. or, for example, in a range of about 980° C. to about 1,000° C. At the first temperature, the firing may be performed for a predetermined time, for example, for about 1 hour to about 10 hours, or, for example, for about 3 hours to about 6 hours. When the firing is performed within the first temperature range, the crystallinity of the $LiCoO_2$ may be improved.

After the firing, while the first temperature is being decreased, the second temperature may be maintained in a range of about 650° C. to about 850° C., or, for example, in a range of about 700° C. to about 750° C. The second temperature may be maintained for about 1 hour to about 10 hours, or, for example, for about 3 hours to about 6 hours. When the second temperature is within the range, a spinel structure may be formed on the surface of the $LiCoO_2$ particle. Thus, electrical conductivity of the surface may be improved.

The temperature decrease rate may be in a rate of about 2° C./min to about 10° C./min, or, for example, about 4° C./min to about 6° C./min. For example, after the firing, the temperature may be decreased from the firing temperature at the temperature decrease rate until the second predetermined temperature is reached, then the temperature may be maintained at the second predetermined temperature for the predetermined time, and then the temperature may be further decreased from the second predetermined temperature at the temperature decrease rate. When the temperature decrease rate is within the range, not only may formation of the spinel structure on the surface be promoted but also, crystallinity of the $LiCoO_2$ particle may be improved.

The heat-treatment may further include maintaining a third temperature for a predetermined time during a period before the firing, when the temperature is being increased up to the firing temperature, as well as maintaining the second temperature when the temperature is being decreased down from the firing temperature. When the third temperature is maintained during the period when the temperature is being increased, lithium ions may be smoothly diffused into a positive active material, and pores inside the positive active material may be decreased. Accordingly, the amount of the $Li_2CO_3$ remaining on the surface may be decreased, and, a SEI film on the surface of the positive active material due to $Li_2CO_3$ may be less formed, resultantly improving battery performance such as cycle-life characteristics and rate capability.

For example, the third temperature maintained before reaching the first temperature may be in a range of about 600° C. to about 700° C., or, for example, in a range of about 630° C. to about 680° C. The third temperature may be maintained for about 1 hour to about 10 hours, or, for example, for about 3 hours to about 6 hours. When the third temperature is maintained within the range, pores inside a positive active material may be reduced, and the amount of the $Li_2CO_3$ remaining on the surface thereof may be decreased, resultantly improving cycle-life characteristics and rate capability of a lithium rechargeable battery.

The temperature increase rate may be in a range of about 2° C./min to about 10° C./min, or, for example, about 4° C./min to about 6° C./min. For example, before the firing, the temperature may increase from a starting temperature (such as an ambient temperature) at the temperature increase rate until the third predetermined temperature is reached, then the temperature may be maintained at the third predetermined temperature for the predetermined time, and then the temperature may be increased from the third predetermined temperature to the firing temperature at the temperature increase rate. When the temperature increase rate is within the range, $Li_2CO_3$ particles may be more diffused into the interior of the positive active material. Porosity inside the $LiCoO_2$ particle and lithium remaining on the surface may be decreased.

When the $LiCoO_2$ particle is manufactured in the above method, electrical conductivity may be increased by controlling the surface structure of the $LiCoO_2$ particle. The amount of $Li_2CO_3$ remaining on the surface may be decreased by activating diffusion of lithium ions into the interior of the positive active material. Accordingly, a rechargeable lithium battery using the $LiCoO_2$ particle as a positive active material may secure excellent cycle-life characteristics and rate capability.

Hereinafter, a rechargeable lithium battery according to an embodiment is described referring to FIG. 1.

Figure 1:
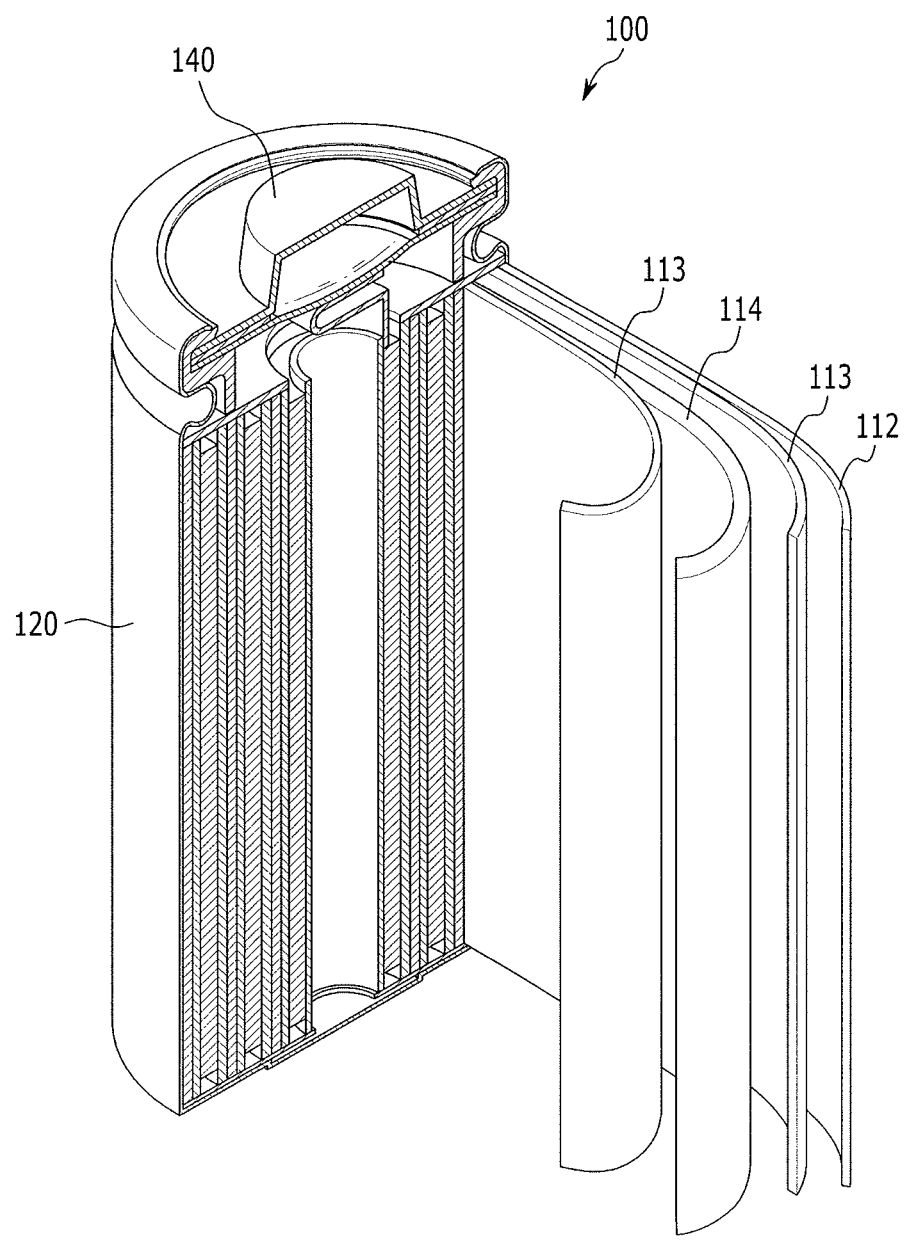
FIG. 1 illustrates a schematic view of a rechargeable lithium battery according to one embodiment.

FIG. 1 illustrates a schematic view showing a rechargeable lithium battery according to an embodiment.

Referring to FIG. 1, a rechargeable lithium battery 100 according to an embodiment may include an electrode assembly including a positive electrode 114, a negative electrode 112 facing the positive electrode 114, a separator 113 interposed between the negative electrode 112 and the positive electrode 114, an electrolyte solution impregnating the positive electrode 114, the negative electrode 112 and the separator 113, a battery case 120 including the electrode assembly, and a sealing member 140 sealing the battery case 120.

The positive electrode 114 may include a current collector and a positive active material layer formed on the current collector. The positive active material layer may include a positive active material, a binder, and, optionally, a conductive material.

The current collector may be made of aluminum (Al), as an example.

The positive active material may include the $LiCoO_2$ particle as described herein. When the positive active material is used, a rechargeable lithium battery having excellent cycle-life characteristics and rate capability may be realized.

The binder may improve binding properties of positive active material particles with one another and with a current collector. Examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acylated styrene-butadiene rubber, an epoxy resin, nylon, or the like.

The conductive material may improve the conductivity of an electrode. A suitable electrically conductive material that does not cause a chemical change may be used as the conductive material. Examples thereof include one or more of natural graphite, artificial graphite, carbon black, acetylene black, ketjen black, a carbon fiber, a metal powder, a metal fiber, and the like of copper, nickel, aluminum, silver, and the like, a conductive material such as a polyphenylene derivative, or the like.

The negative electrode 112 may include a current collector and a negative active material layer formed on the current collector.

The current collector may be made of copper (Cu), as an example.

The negative active material layer may include a negative active material, a binder, and, optionally, a conductive material.

The negative active material may be a material that reversibly intercalates/deintercalates lithium ions, a lithium metal, a lithium metal alloy, a material being capable of doping and dedoping lithium, or transition metal oxide.

The material that reversibly intercalates/deintercalates lithium ions may be a carbon material. The carbon material may be suitable carbon-based negative active material for a rechargeable lithium battery. Example of the carbon material include crystalline carbon, amorphous carbon, or a mixture thereof. Examples of the crystalline carbon include graphite such as amorphous, sheet-shape, flake, spherical shaped, or fiber-shaped natural graphite, or artificial graphite. Examples of the amorphous carbon include soft carbon or hard carbon, a mesophase pitch carbonized product, fired coke, or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$, (0<x<2), a Si—C composite, a Si-Q alloy (herein, the Q is an element selected from an alkali metal, an alkaline-earth metal, Group 13 to 16 elements, a transition metal, a rare earth element, and a combination thereof, and not Si), Sn, $SnO_2$, a Sn—C composite, Sn—R (herein, the R is an element selected from an alkali metal, an alkaline-earth metal, Group 13 to 16 elements, a transition metal, a rare earth element, and a combination thereof, and not Sn), or the like. At least one of these may be mixed with $SiO_2$. Specific examples of the Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, or the like.

The binder may improve binding properties of negative active material particles with one another and with a current collector. Examples of the binder include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may improve electrical conductivity of an electrode. A suitable electrically conductive material that does not cause a chemical change may be used as a conductive material. Examples thereof include a carbon-based material such as natural graphite, artificial graphite, carbon black, acetylene black, ketjen black, a carbon fiber, or the like; a metal-based material such as a metal powder or a metal fiber, or the like, of copper, nickel, aluminum, silver, or the like; a conductive polymer such as a polyphenylene derivative or the like; or a mixture thereof.

The negative electrode 112 and the positive electrode 114 may be manufactured by a method including mixing each active material, a binder, and a conductive material to provide an active material composition, and coating the active material composition on a respective current collector. The solvent may be, for example, an organic solvent such as N-methylpyrrolidone or the like, or may be an aqueous solvent such as water or the like, in accordance with the kind of binder that is used. A suitable electrode manufacturing method may be used.

The electrolyte solution may include an organic solvent and a lithium salt.

The organic solvent may serve as a medium for transmitting ions taking part in the electrochemical reaction of a battery. The organic solvent may be selected from a carbonate-based, ester-based, ether-based, ketone-based, alcohol-based and aprotic solvent.

The carbonate-based solvent may be, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When the carbonate-based solvent is prepared by mixing a cyclic carbonate and a linear carbonate, a solvent having a low viscosity while having an increased dielectric constant may be obtained. The cyclic carbonate and the linear carbonate may be mixed together in the volume ratio of about 1:1 to about 1:9.

The ester-based solvent may include, for example, methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example, dibutylether, tetraglyme, diglyme, dimethoxyethane, 2-methyltetrahydrofuran, tetrahydrofuran, or the like. The ketone-based solvent may include cyclohexanone, or the like. The alcohol-based solvent may include ethanol, isopropyl alcohol, or the like.

The organic solvent may be used singularly or in a mixture. When the organic solvent is used in a mixture, the mixture ratio may be controlled in accordance with a desirable battery performance.

The electrolyte solution may further include an overcharge-inhibiting additive such as ethylene carbonate, pyrocarbonate, or the like.

The lithium salt dissolved in the non-aqueous organic solvent may supply lithium ions in the battery, may facilitate a basic operation of a rechargeable lithium battery, and may improve lithium ion transportation between positive and negative electrodes.

Specific examples of the lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, e.g., an integer of 1 to 20), LiCl, LiI, $LiB(C_2O_4)_2$ (lithium bis(oxalato)borate; LiBOB), and a combination thereof.

The lithium salt may be used at a concentration ranging from, for example, about 0.1 M to about 2.0 M. When the lithium salt is included at the concentration range, an electrolyte solution may have excellent performance and lithium ion mobility due to appropriate conductivity and viscosity of an electrolyte solution.

The separator 113 may include suitable material for separating the negative electrode 112 from the positive electrode 114 and providing a transporting passage of lithium ion in a lithium battery. For example, the separator 113 may have a low resistance to ion transport and an excellent impregnation for an electrolyte solution. A material of the separator 113 may be selected from, for example, glass fiber, polyester, polyethylene, polypropylene, polytetrafluoroethylene (PTFE), or a combination thereof. The material of the separator 113 may have the form of a non-woven fabric or a woven fabric. For example, for the lithium ion battery, a polyolefin-based polymer separator such as polyethylene, polypropylene or the like may be. In order to ensure heat resistance or mechanical strength, a coated separator including a ceramic component or a polymer material may be used. The separator 113 may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Positive Active Material)

EXAMPLE 1

A spherical $LiCoO_2$ particle having a particle diameter (D50) of 18 μm was manufactured by mixing spherical $Co_3O_4$ having a diameter of 15 μm and shapeless $Li_2CO_3$ having a size of 1 μm to 2 μm in a Co:Li mole ratio of 1:1 and firing the mixture under an air atmosphere by heating the mixture at a rate of 5° C./min to 650° C., then maintaining the mixture at 650° C. for 3 hours, then heating the mixture from 650° C. to 1,000° C. at the rate of 5° C./min, then firing the mixture at 1,000° C. for 6 hours, then decreasing the temperature from 1,000° C. at a rate of decrease of 5° C./min, then maintaining the mixture at 750° C. for 3 hours, then decreasing the temperature from 750° C. to the starting temperature at a rate of decrease of 5° C./min.

COMPARATIVE EXAMPLE 1

A $LiCoO_2$ particle having a particle diameter (D50) of 18 μm was manufactured by mixing $Co_3O_4$ and $Li_2CO_3$ having a particle diameter (D50) of 5 μm in a Co:Li mole ratio of 1:1.03 and firing the mixture at 1,000° C. for 6 hours under an air atmosphere.

COMPARATIVE EXAMPLE 2

A $LiCoO_2$ particle having a particle diameter (D50) of 18 μm was manufactured by mixing $Co_3O_4$ and $Li_2CO_3$ having a particle diameter (D50) of 15 μm in a Co:Li mole ratio of 1:1 and firing the mixture at 1,000° C. for 6 hours under an air atmosphere.

COMPARATIVE EXAMPLE 3

A $LiCoO_2$ particle having a particle diameter (D50) of 18 μm was manufactured by mixing $Co_3O_4$ and $Li_2CO_3$ having a particle diameter (D50) of 15 μm in a Co:Li mole ratio of 1:1 and firing the mixture at 1,000° C. for 6 hours under an air atmosphere. Herein, the heat treatment was performed by maintaining the mixture at 650° C. for 3 hours while the temperature was being increased up to 1,000° C. at 5° C./min.

Figure 2:
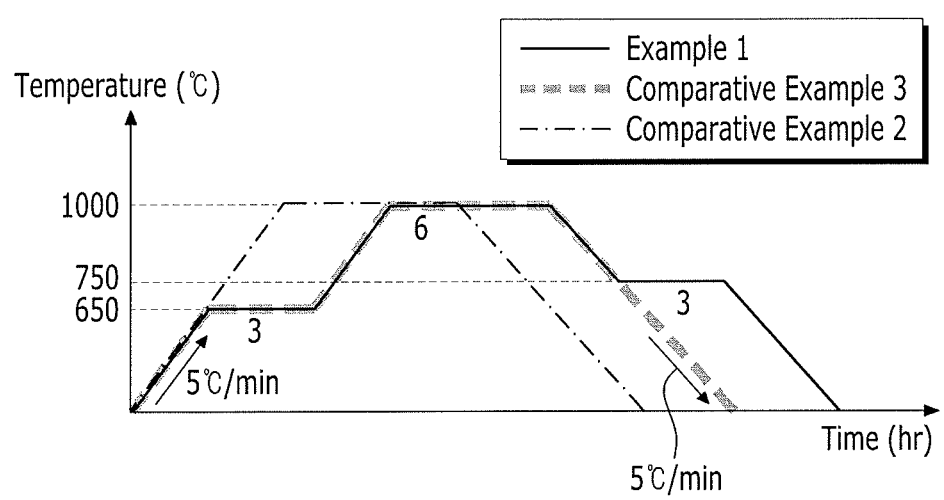
FIG. 2 illustrates a graph showing profiles of firing temperatures during preparation of the positive active materials according to Example 1 and Comparative Examples 2 and 3.

For reference, FIG. 2 is a graph showing profiles of firing temperatures during preparation of the positive active materials according to Example 1 and Comparative Examples 2 and 3.

(Manufacture of Rechargeable Lithium Battery Cell)

92 wt % of each positive active material according to Example 1 and Comparative Examples 1 to 3, 4 wt % of polyvinylidene fluoride (PVDF) and 4 wt % of acetylene black were mixed and then, dispersed into N-methyl-2-pyrrolidone, preparing a slurry. Subsequently, the slurry was coated onto an aluminum foil and then, dried and compressed, manufacturing a positive electrode.

The positive electrode and metal lithium as its counter electrode were used to manufacture a coin-type half-cell. An electrolyte solution was prepared by mixing ethylenecarbonate (EC), ethylmethylcarbonate (EMC) and dimethylcarbonate (DMC) (EC:EMC:DMC=3:4:3 in a volume ratio) to prepare a solvent and dissolving 1.3 M $LiPF_6$ therein.

Evaluation 1: True Density of Positive Active Material

True density of each positive active material according to Example 1 and Comparative Examples 1 to 3 was measured by using a true density measuring equipment (Gas Pycnometer, G PYC-100, PMI, USA), and the results are provided in the following Table 1.

Specifically, the true density was calculated by obtaining Vs according to the following formula: P1(Vc−Vs)=P2(Vc−Vs+Vr). In this formula, Vc indicates the volume of a sample chamber, Vr indicates the volume of a reference chamber, Vs indicates the volume of a sample, P1 indicates an equilibrium pressure in the sample chamber, and P2 indicates an equilibrium pressure after an expansion valve was open.

TABLE 1

|  | True density (g/cm³) |
| --- | --- |
| Example 1 | 5.062 |
| Comparative Example 1 | 5.013 |
| Comparative Example 2 | 5.052 |
| Comparative Example 3 | 5.052 |

Referring to Table 1, the $LiCoO_2$ particle of Example 1, manufactured by using a precursor with a large size and having a temperature maintenance period during a decrease of the temperature after the firing, showed true density ranging from 5.054 g/cm³ to 5.070 g/cm³ compared with the particles of Comparative Examples 1 to 3 having a smaller true density. Accordingly, as lithium ions were actively diffused inside the positive active material, it can be determined that the amount of the $Li_2CO_3$ remaining on the surface of the positive active material was reduced, resultantly improving battery performance such as cycle-life characteristics and rate capability.

Evaluation 2: SEM Analysis of Positive Active Material

Figure 3A:
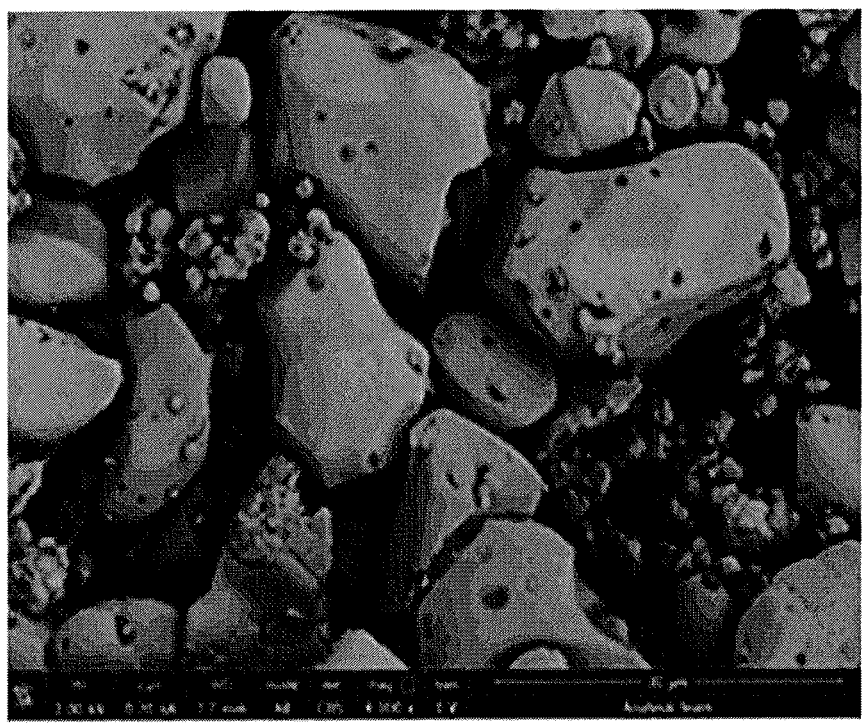
FIGS. 3A and 3B illustrate respective scanning electron microscope (SEM) images of the positive active materials according to Comparative Example 1 and Comparative Example 2.
Figure 3B:
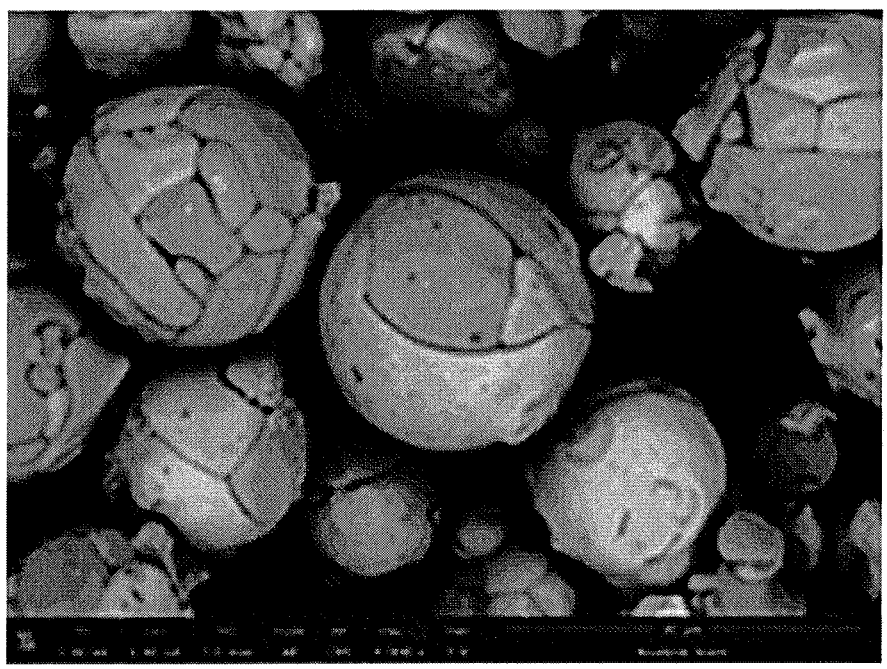

FIGS. 3A and 3B respectively illustrate scanning electron microscope (SEM) images of the positive active materials according to Comparative Example 1 and Comparative Example 2.

As shown in FIGS. 3A and 3B, the $LiCoO_2$ particle of Comparative Example 2 manufactured by using a spherical precursor having a size of 15 μm had various shapes compared with the $LiCoO_2$ particle of Comparative Example 1 manufactured by using a precursor having a size of less than or equal to 5 μm. Accordingly, a precursor having a larger size turned out to secure a positive electrode having high mass density.

Figure 4A:
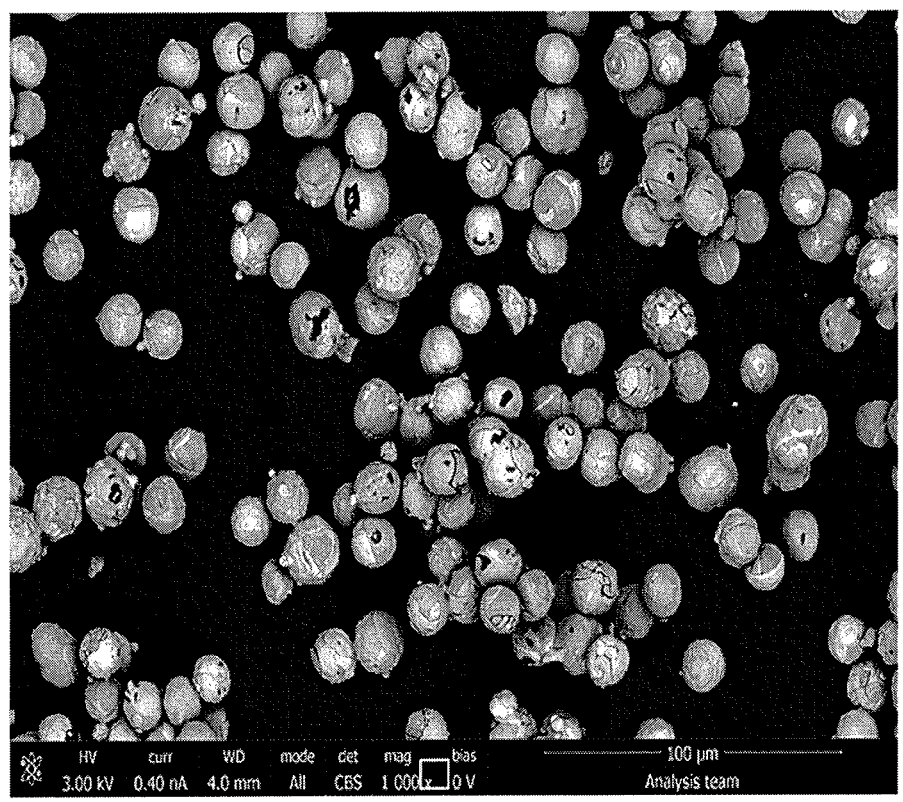
FIGS. 4A and 4B illustrate respective scanning electron microscope (SEM) images of the surface and cross-section of the positive active materials according to Comparative Example 2.
Figure 4B:
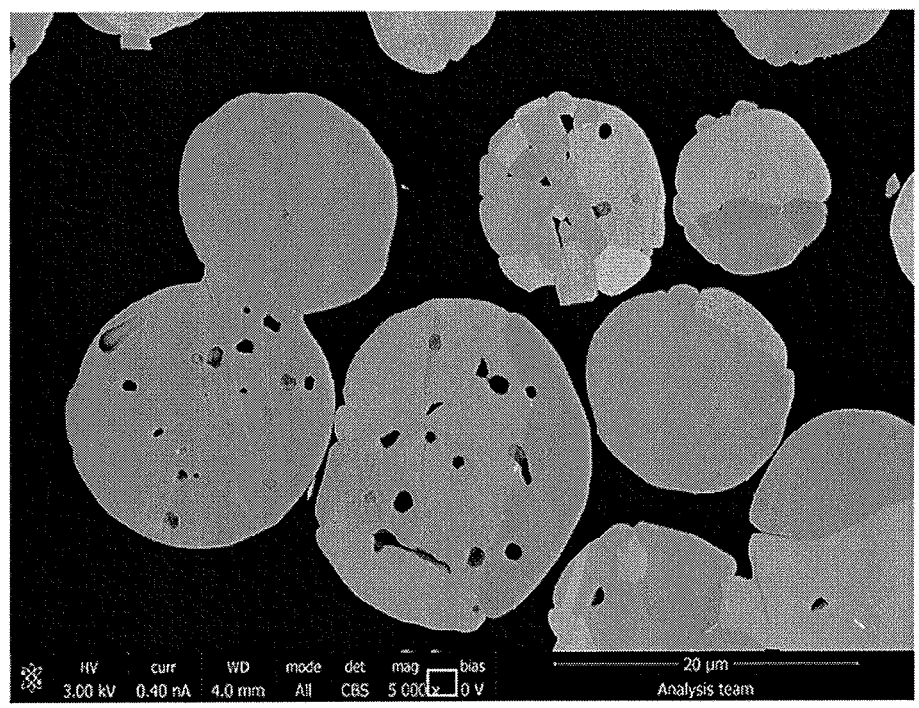
Figure 5A:
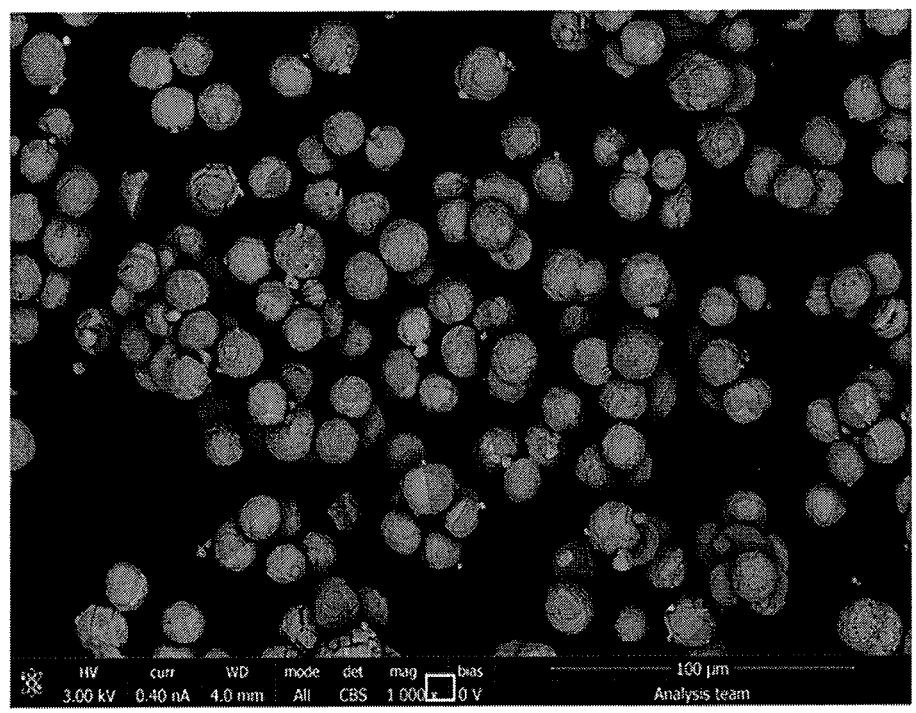
FIGS. 5A and 5B illustrate respectively scanning electron microscope (SEM) images of the surface and cross-section of the positive active materials according to Comparative Example 3.
Figure 5B:
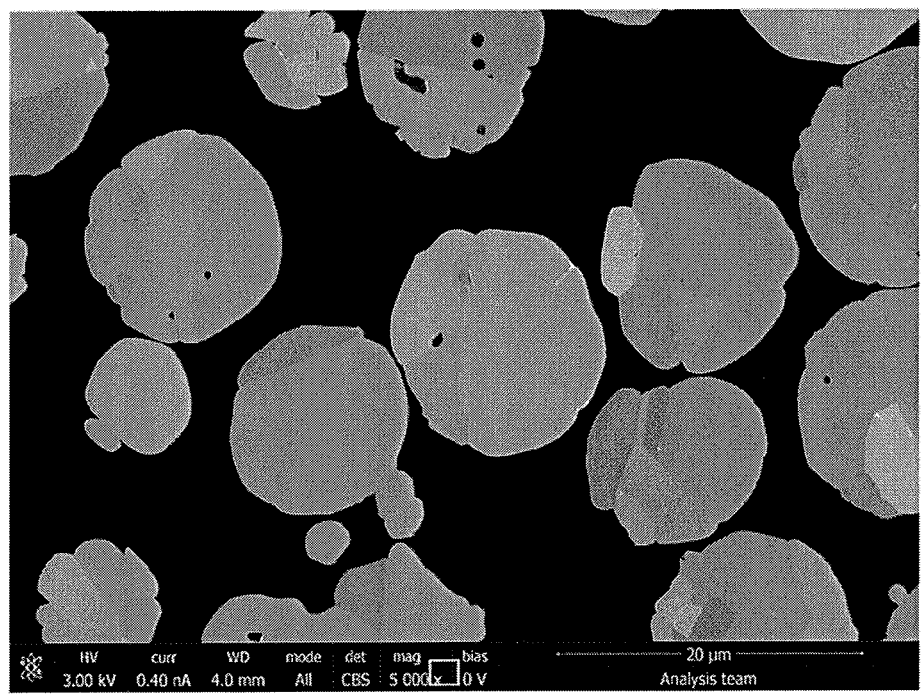

FIGS. 4A and 4B respectively illustrate scanning electron microscope (SEM) images of the surface and cross-section of the positive active materials according to Comparative Example 2. FIGS. 5A and 5B respectively illustrate scanning electron microscope (SEM) images of the surface and cross-section of the positive active materials according to Comparative Example 3.

Referring to FIGS. 4A and 5A, the $LiCoO_2$ particle of Comparative Example 2 manufactured without having a temperature maintenance period while the temperature being increased before the firing, showed lithium remaining on the surface, whereas the $LiCoO_2$ particle of Comparative Example 3 manufactured by having a temperature maintenance period while a temperature being increased before the firing showed almost no lithium on the surface.

In addition, referring to FIGS. 4B and 5B, the $LiCoO_2$ particle of Comparative Example 2 were shown to have more pores inside the particle compared with the particle of Comparative Example 3.

Figure 6A:
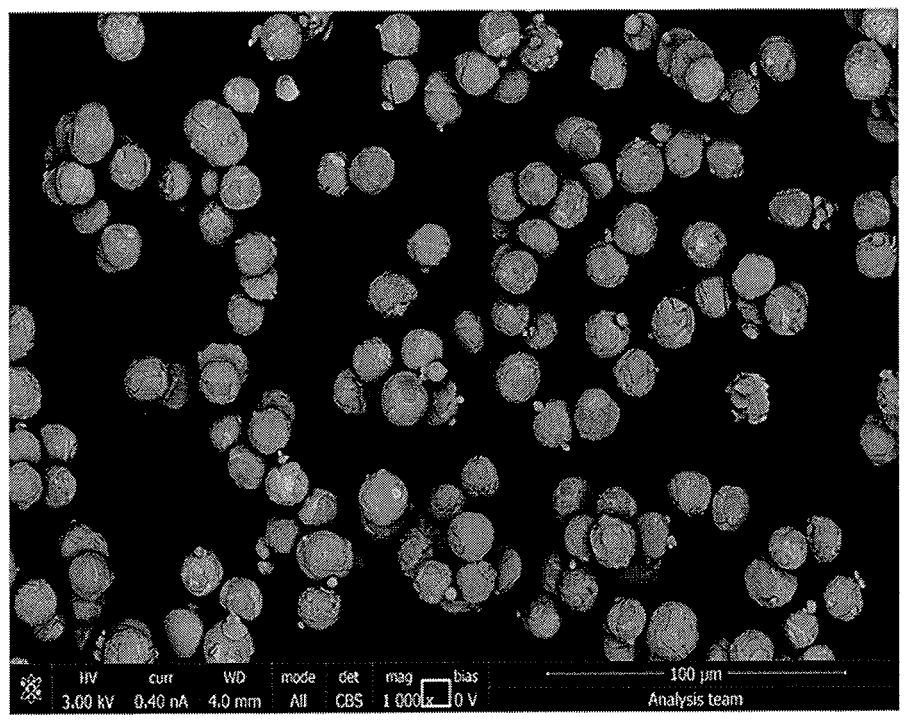
FIGS. 6A and 6B illustrate respectively 1,000 magnification and 5,000 magnification scanning electron microscope (SEM) images of the surface of the positive active material of Example 1.
Figure 6B:
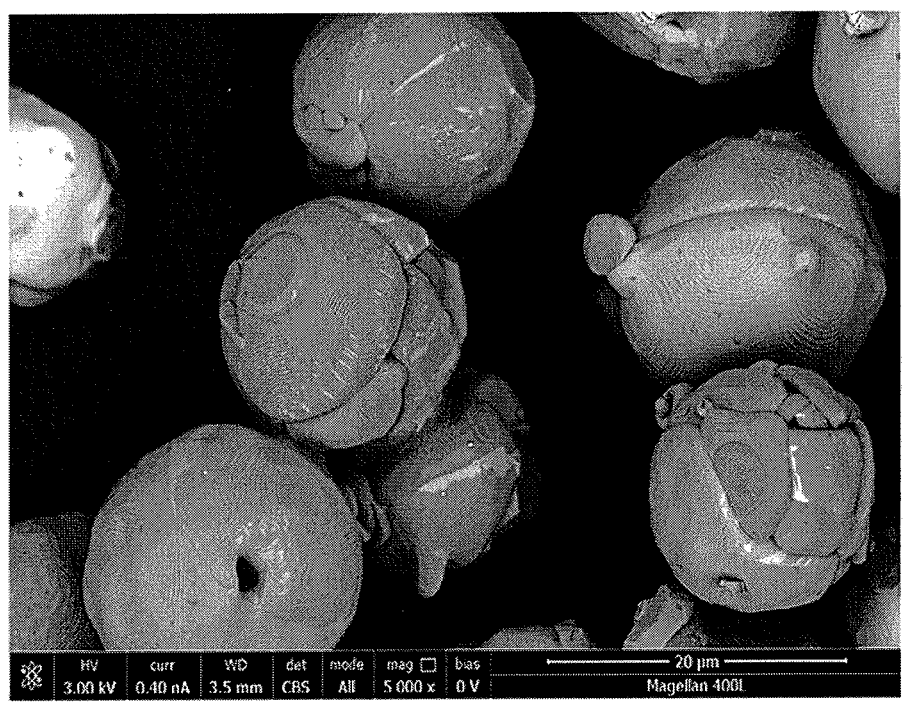

FIGS. 6A and 6B respectively illustrate 1,000 magnification and 5,000 magnification scanning electron microscope (SEM) images of the surface of the positive active material of Example 1.

Referring to FIGS. 6A and 6B, the $LiCoO_2$ particle of Example 1 using a spherical precursor having a size of 15 μm and having a temperature maintenance period while the temperature was decreased after the firing, was shown to have a uniform shape and almost no lithium on the surface.

Evaluation 3: XRD Analysis of Positive Active Material

Figure 7:
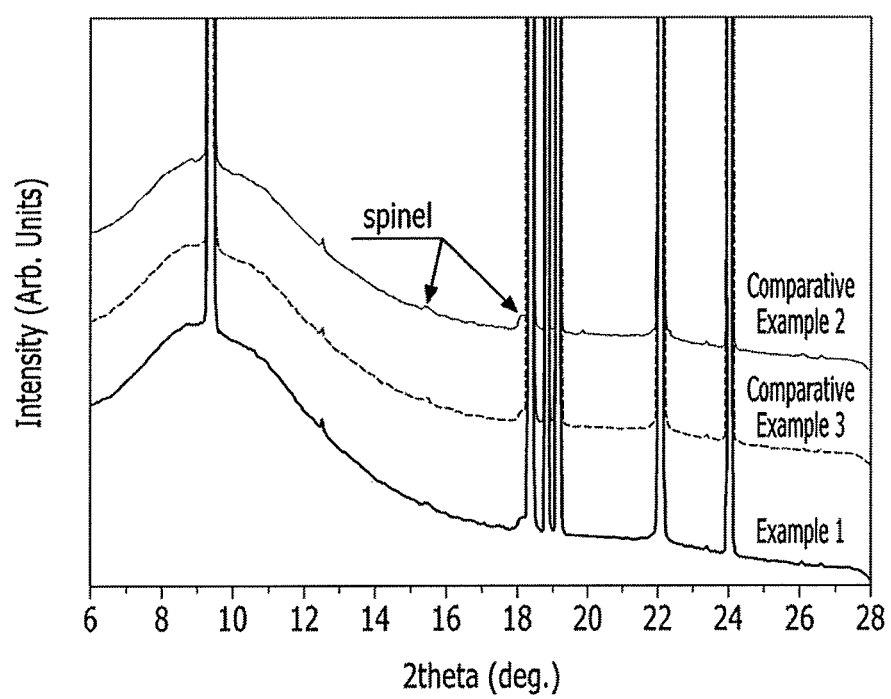
FIG. 7 illustrates X-ray diffraction analysis (XRD) graph of the positive active materials according to Example 1 and Comparative Examples 2 and 3.

FIG. 7 illustrates an X-ray diffraction analysis (XRD) graph showing the positive active materials according to Example 1 and Comparative Examples 2 and 3.

Referring to FIG. 7, the $LiCoO_2$ particles of Example 1 and Comparative Examples 2 and 3 were shown to have a layered structure (R-3m) and simultaneously, a spinel structure inside the $LiCoO_2$ particles.

Evaluation 4: TEM Analysis of Positive Active Material

Figure 8A:
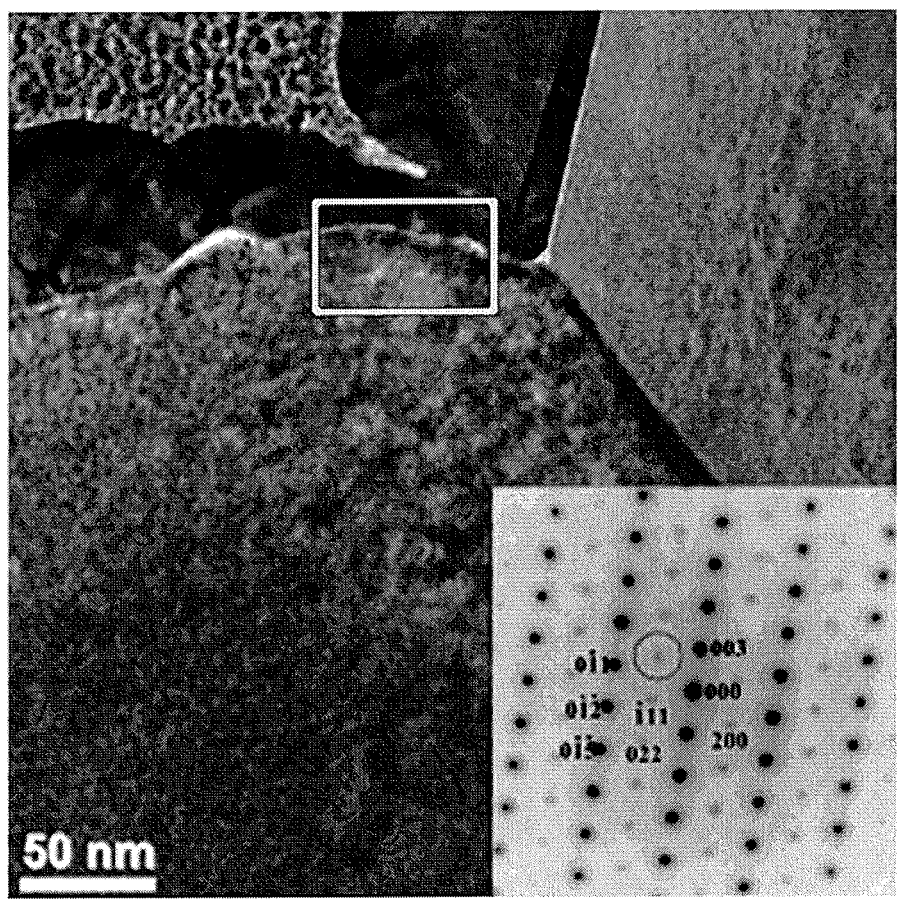
FIG. 8A illustrates a transmission electron microscope (TEM) image of the surface of the positive active material of Comparative Example 3.
Figure 8B:
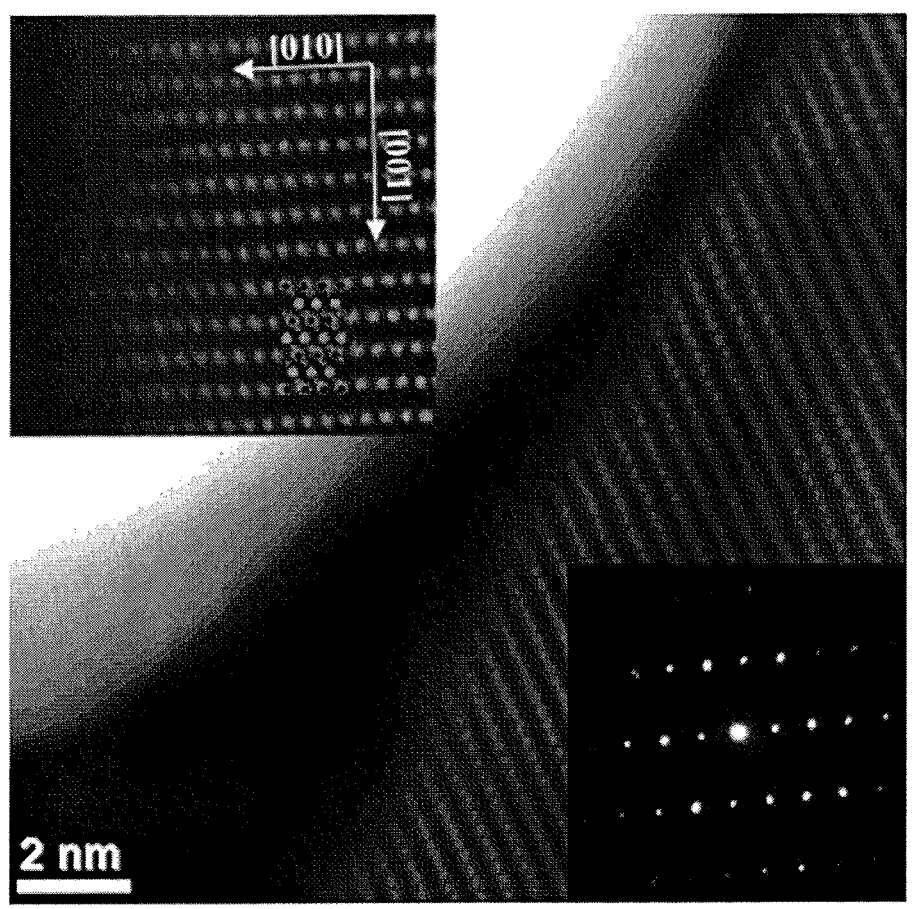
FIG. 8B illustrates a scanning transmission electron microscope (STEM) image of the square region of FIG. 8A.
Figure 9A:
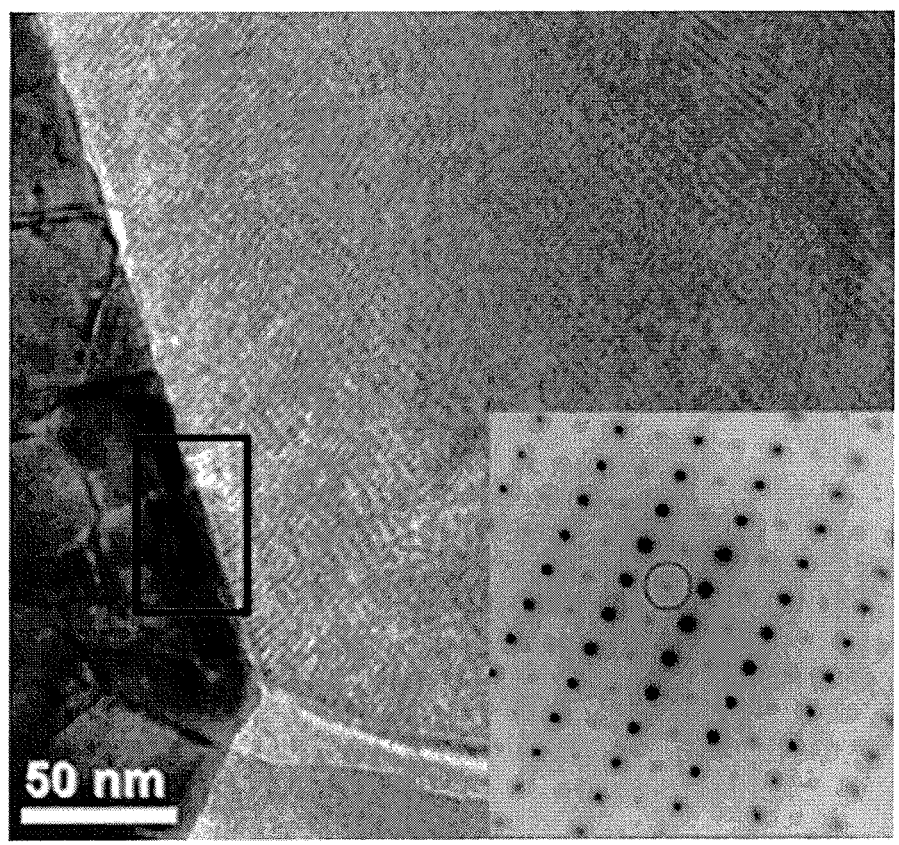
FIG. 9A illustrates a transmission electron microscope (TEM) image of the surface of the positive active material of Example 1.

FIG. 8A illustrates a transmission electron microscope (TEM) image showing the surface of the positive active material of Comparative Example 3, and FIG. 8B illustrates a scanning transmission electron microscope (STEM) image showing the square region of FIG. 8A. FIG. 9A illustrates a transmission electron microscope (TEM) image showing the surface of the positive active material of Example 1, and FIG. 9B illustrates a scanning transmission electron microscope (STEM) image showing the square region of FIG. 9A.

Figure 9B:
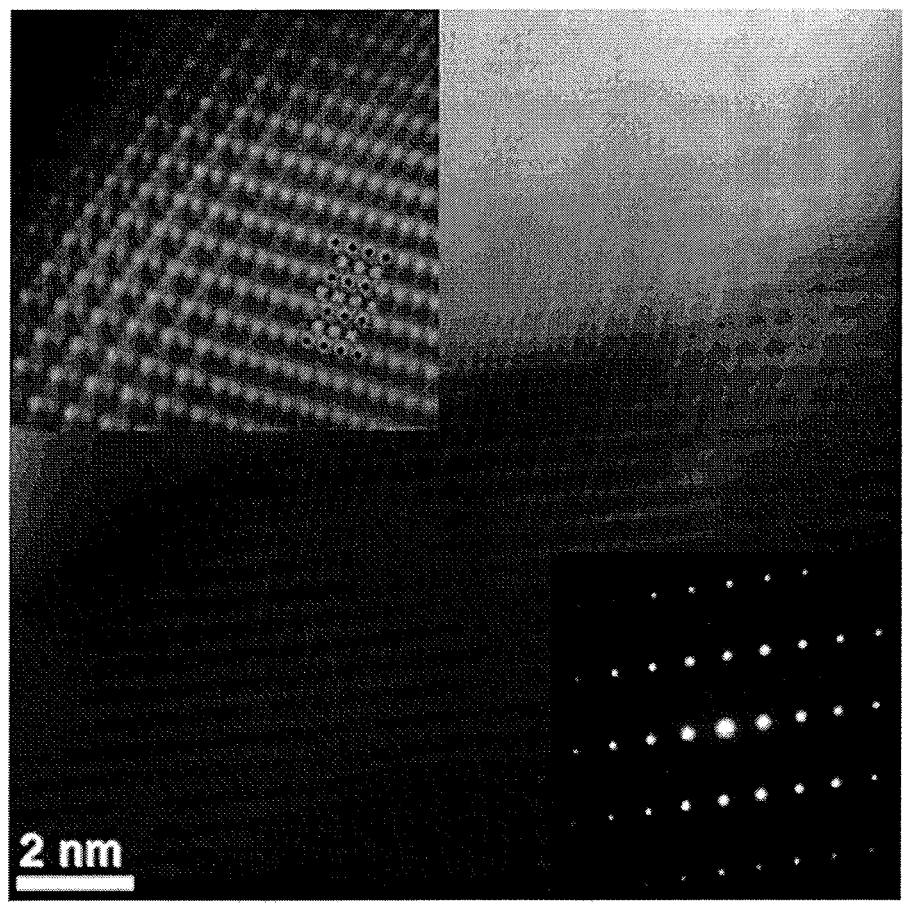
FIG. 9B illustrates a scanning transmission electron microscope (STEM) image of the square region of FIG. 9A.
Figure 10A:
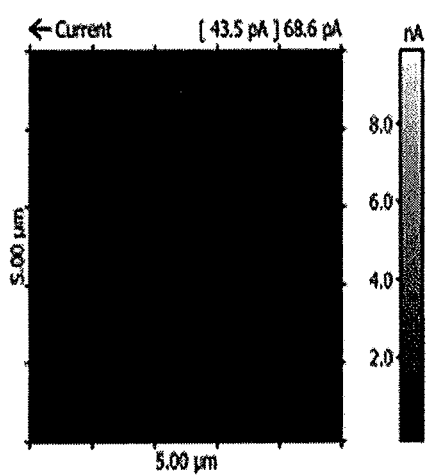
FIGS. 10(a) and (b) respectively show the current-AFM result on the surface of a particle and morphology in a measuring region.
Figure 10B:
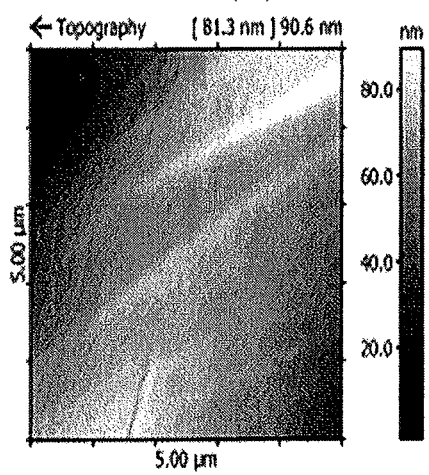
FIG. 10 illustrates a current-AFM (atomic force microscope) measurement results of the surface of the positive active material according to Comparative Example 3.
FIG. 10(d) shows current line profiles with respect to a distance from the inside of a particle to the surface. The distance was measured from the line marked in FIG. 10(c).
Figure 10C:
Figure 10D:
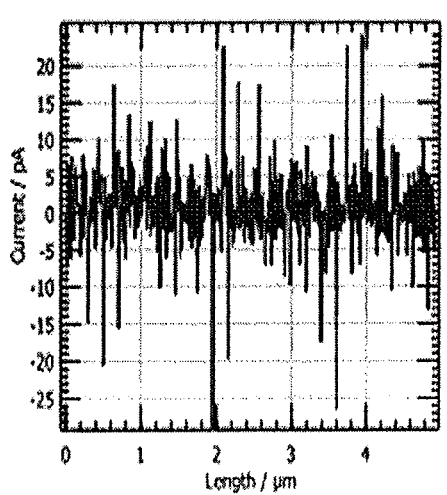

Referring to FIGS. 8B and 9B, Example 1 showed a diffraction pattern having a spinel structure around the interface of the surface of the $LiCoO_2$ particle with its grain, while Comparative Example 3 showed a diffraction pattern having a layered structure around the interface of the surface of the $LiCoO_2$ particle with its grain.

Accordingly, the $LiCoO_2$ particle of Example 1 using a precursor having a larger size and formed by a method including a temperature maintenance period when the temperature was decreased after the firing, was shown to have a layered structure internally but a spinel structure on the surface, specifically, on the outermost surface. In contrast, the $LiCoO_2$ particle of Comparative Example 3 formed by a method including no temperature maintenance when a temperature was decreased, was shown to have a layered structure on the outmost surface.

Evaluation 5: Current-AFM Analysis of Positive Active Material

Electrical characteristics of the surface of each positive active material according to Example 1 and Comparative Example 3 were analyzed by using a current-AFM (atomic force microscope) measuring apparatus (Danish Microscope Engineering, Denmark). The results are provided in FIGS. 10 and 11.

The current-AFM measuring apparatus used a tip coated with diamond. The surface was pre-treated by helium ion microscopy in order to prevent contamination of the surface. The current-AFM measuring apparatus was mounted in an SEM apparatus (a vacuum degree of $10^{-8}$ torr), and a sample was pressed by the tip with a pressure of 1.6 $e^4$ nN during the contact mode measurement.

In FIGS. 10 and 11,(a) and (b) respectively show the current-AFM result on the surface of a particle and morphology in a measuring region. Referring to each (a) of FIGS. 10 and 11, FIG. 11 of Example 1 showed a bright color on the surface and thus, a high current flowing near the surface compared with FIG. 10 of Comparative Example 3. Herein, a voltage of 3 V was applied thereto.

In FIGS. 10 and 11,(d) shows current line profiles with respect to a distance from the inside of a particle to the surface. The distance was measured from the line marked in (c). Referring to each (d) of FIGS. 10 and 11, FIG. 11 of Example 1 shows that a current of 2.5 nA flowed at the applied voltage of 3 V, while FIG. 10 of Comparative Example 3 shows that no current flowed.

Accordingly, Example 1 using a precursor with a larger size and having a temperature maintenance period when a temperature was decreased after the firing, showed improved electrical characteristics due to formation of a spinel structure on the surface of a particle compared with Comparative Example 3 having no temperature maintenance period when a temperature was decreased after the firing.

Evaluation 6: Cycle-life Characteristics of Rechargeable Lithium Battery Cell

Cycle-life characteristics of rechargeable lithium battery cells respectively using the positive active materials according to Example 1 and Comparative Examples 2 and 3 were evaluated in a charge range of 3.0 V to 4.4 V. The results are provided in FIG. 12.

FIG. 12 illustrates a graph showing cycle-life characteristics of the rechargeable lithium battery cells according to Example 1 and Comparative Examples 2 and 3.

Referring to FIG. 12, the rechargeable lithium battery cell of Example 1 manufactured by using a precursor with a larger size and having a temperature maintenance period when a temperature was decreased after the firing showed excellent cycle-life characteristics compared with the rechargeable lithium battery cells of Comparative Examples 2 and 3 manufactured by having no temperature maintenance period when the temperature was decreased after the firing.

Evaluation 7: Rate Capability of Rechargeable Lithium Battery Cell

The rechargeable lithium battery cells manufactured by respectively using the positive active materials according to Example 1 and Comparative Examples 2 and 3 were charged under a condition of 0.1 C, 0.2 C, 0.5 C, 1.0 C, 2.0 C and 3.0 C at a voltage of 3.0 V to 4.4 V, and then, their rate capabilities were evaluated. The results are provided in FIG. 13.

FIG. 13 illustrates a graph showing rate capability of the rechargeable lithium battery cells according to Example 1 and Comparative Examples 2 and 3.

Referring to FIG. 13, the rechargeable lithium battery cell of Example 1, manufactured by using a precursor with a larger size and having a temperature maintenance period when a temperature was decreased after the firing, showed excellent rate capability compared with the rechargeable lithium battery cells of Comparative Examples 2 and 3 manufactured by having no temperature maintenance period when the temperature was after firing.

Evaluation 8: Impedance of Rechargeable Lithium Battery Cell

The impedances of the rechargeable lithium battery cells respectively using the positive active materials of Example 1 and Comparative Examples 2 and 3 were measured under a condition of 500 kHz to 5 mHz with an amplitude of 10 mV. The results are provided in FIG. 14.

FIG. 14 illustrates a graph showing impedances of the rechargeable lithium battery cells according to Example 1 and Comparative Examples 2 and 3.

Referring to FIG. 14, the rechargeable lithium battery cell, manufactured according to Example 1 by using a precursor with a larger size and having a temperature maintenance period when the temperature was decreased after firing, showed the lowest sheet resistance compared with the rechargeable lithium battery cells manufactured according to Comparative Examples 2 and 3 by having no temperature maintenance period when the temperature was decreased after firing.

Evaluation 9: GITT Analysis of Rechargeable Lithium Battery Cell

In order to evaluate a diffusion degree of lithium ions inside the positive active materials of Example 1 and Comparative Examples 2 and 3, galvanostatic intermittent titration technique (GITT) analysis of the rechargeable lithium battery cells was performed, and the results are provided in FIG. 15. The galvanostatic intermittent titration technique (GITT) analysis was measured using a VMP3 in the voltage range of 3.0V to 4.5 V at a current density of 0.1 C, and the cells were charged for 12 minutes with a rest time of 2 hours.

FIG. 15 illustrates a graph showing the GITT results of the rechargeable lithium battery cells according to Example 1 and Comparative Examples 2 and 3.

Referring to FIG. 15, the rechargeable lithium battery cell manufactured according to Example 1 by using a precursor with a larger size and having a temperature maintenance period when the temperature was decreased after firing showed a high diffusion degree of lithium ions compared with the rechargeable lithium battery cells manufactured according to Comparative Examples 2 and 3 by having no temperature maintenance period when a temperature was decreased.

Based on the above evaluations, Example 1 showed that a spinel structure having high electrical conductivity and ion conductivity was formed on the surface of a particle. A defect or a potential (dislocation) inside the particle was diffused in a surface direction by having a temperature maintenance period when the temperature was decreased after the firing during heat treatment of the particle. In contrast, the rechargeable lithium battery cells of Comparative Examples 2 and 3 showed that a spinel structure was formed inside a $LiCoO_2$ particle during formation of the $LiCoO_2$ particle. Accordingly, a rechargeable lithium battery cell having improved cycle-life characteristics and rate capability was realized.

By way of summation and review, as a positive active material for a rechargeable lithium battery, $LiCoO_2$ is widely used. To reduce a side reaction with an electrolyte solution or the like, it is desirable to synthesize $LiCoO_2$ to have a large particle diameter of greater than or equal to about 15 μm. The $LiCoO_2$ is generally synthesized by using a precursor having a smaller particle diameter than about 5 μm and injecting an excessive amount of a raw lithium material thereinto to grow a $LiCoO_2$ particle of greater than or equal to about 15 μm, in process that involves firing at a high temperature. When the $LiCoO_2$ particle is synthesized in this method, $Li_2CO_3$ may remain on the surface of the particle and may forma film there during charge and discharge of a cell.

Embodiments advance the art by providing a positive active material for a rechargeable lithium battery having improved cycle-life characteristics and rate capability by improving electrical conductivity Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A positive active material for a rechargeable lithium battery, comprising
a $LiCoO_2$ particle,
wherein an interior of the particle has a layered structure and a surface of the particle has a spinel structure.

2. The positive active material as claimed in claim 1, wherein the layered structure is a $LiCoO_2$ phase, and
the spinel structure is a $LiCo_2O_4$ phase.

3. The positive active material as claimed in claim 1, wherein the $LiCoO_2$ particle has a true density of about 5.054 g/cm$^3$ to about 5.070 g/cm$^3$.

4. The positive active material as claimed in claim 1, wherein the $LiCoO_2$ particle has a particle diameter (D50) of about 15 μm to about 25 μm.

5. The positive active material as claimed in claim 1, wherein the $LiCoO_2$ particle has a spherical shape.

6. A method of preparing a positive active material for a rechargeable lithium battery, the method comprising
mixing a Co raw material having a particle diameter (D50) of about 10 μm to about 20 μm and a Li raw material to obtain a mixture; and
heat-treating the mixture,
wherein the heat-treating includes firing the mixture at a first temperature, and, after the firing, maintaining a resultant for a predetermined time at a second temperature lower than the first temperature such that a $LiCoO_2$ particle is provided wherein an interior of the particle has a layered structure and a surface of the particle has a spinel structure.

7. The method as claimed in claim 6, wherein:
the first temperature is about 950° C. to about 1050° C., and
the second temperature is about 650° C. to about 850° C.

8. The method as claimed in claim 6, wherein the predetermined time that the resultant is maintained at the second temperature is about 3 hours to about 6 hours.

9. The method as claimed in claim 6, wherein the heat-treating further includes maintaining the mixture for a predetermined time at a third temperature before firing the mixture at the first temperature, the third temperature being lower than the first temperature.

10. The method as claimed in claim 9, wherein:
the first temperature is about 950° C. to about 1050° C., and
the third temperature is about 600° C. to about 700° C.

11. The method as claimed in claim 9, wherein the predetermined time at which the mixture is maintained at the third temperature is about 3 hours to about 6 hours.

12. The method as claimed in claim 6, wherein the Co raw material and the Li raw material are mixed such that a mole ratio of Co to Li is about 1:0.98 to about 1:1.02.

13. A rechargeable lithium battery, comprising
a positive electrode including the positive active material as claimed in claim 1.

* * * * *